No. 633,331. Patented Sept. 19, 1899.
J. M. WELCH.
HAND PLANTER.
(Application filed June 12, 1899.)
(No Model.) 2 Sheets—Sheet 2.
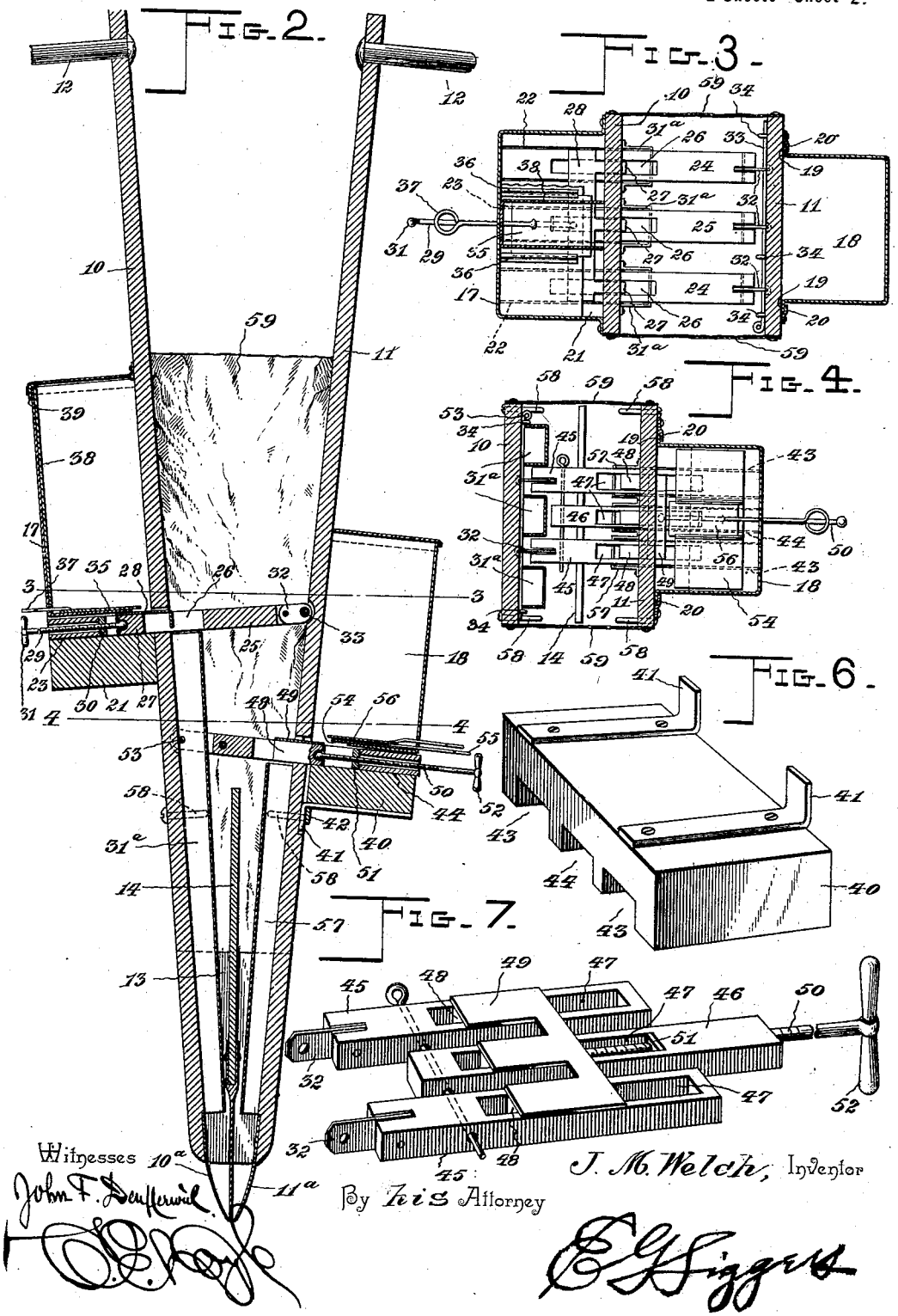

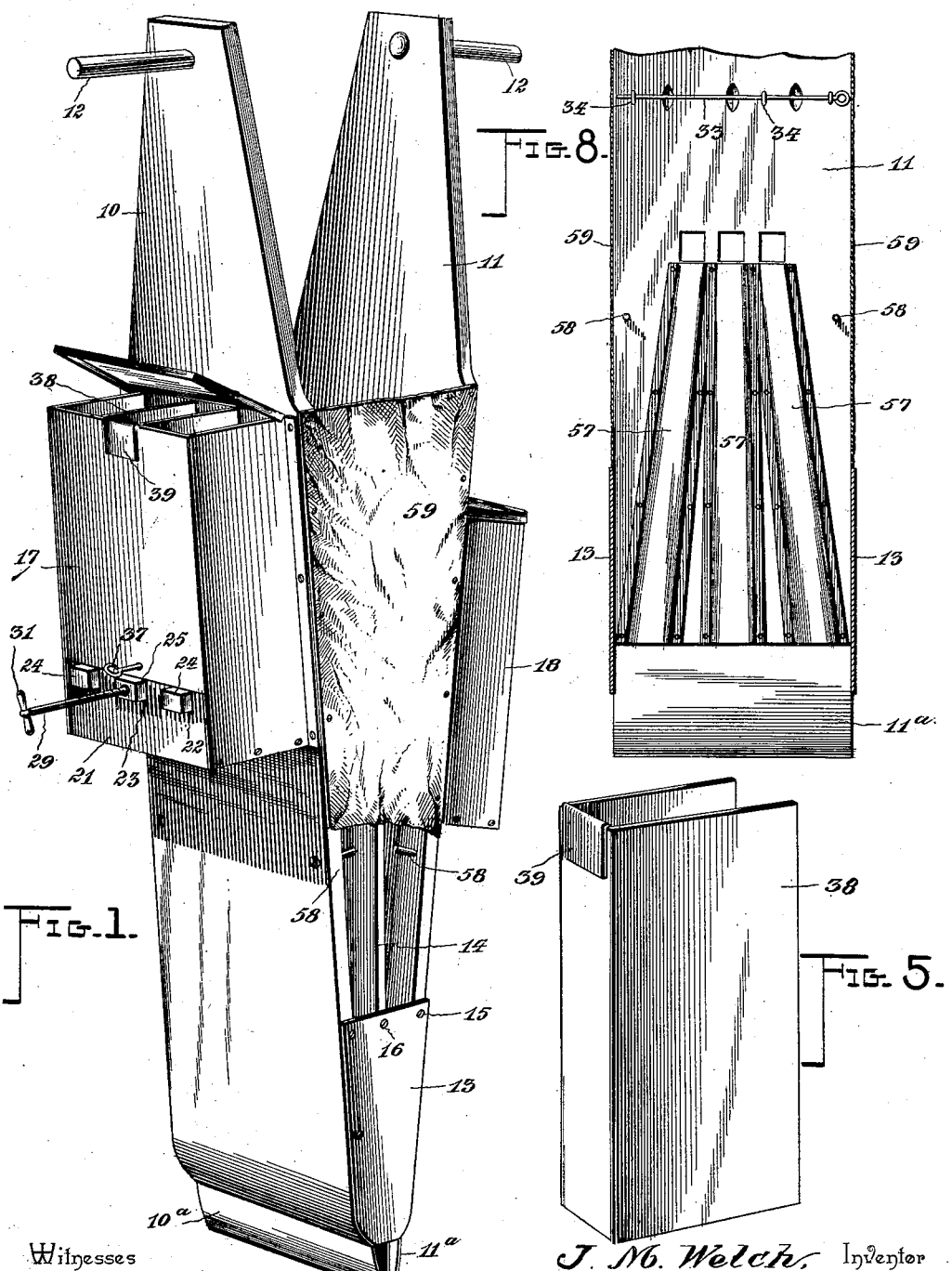

UNITED STATES PATENT OFFICE.

JAMES M. WELCH, OF LOONEYVILLE, WEST VIRGINIA.

HAND-PLANTER.

SPECIFICATION forming part of Letters Patent No. 633,331, dated September 19, 1899.

Application filed June 12, 1899. Serial No. 720,225. (No model.)

*To all whom it may concern:*

Be it known that I, JAMES M. WELCH, a citizen of the United States, residing at Looneyville, in the county of Roane and State of West Virginia, have invented a new and useful Hand-Planter, of which the following is a specification.

My invention relates to hand-planters for corn and analogous substances, and has for its object to provide a construction and arrangement of parts whereby the seed may be planted in hills at a desirable distance apart regulated by means under the control of the operator, and, furthermore, to provide a device of the class named wherein the areas of the feed-openings may be regulated and whereby a plurality of substances, such as corn and fertilizer, and either beans or pumpkin-seeds, may be planted simultaneously.

Further objects and advantages of this invention will appear in the following description and the novel features thereof will be particularly pointed out in the appended claims.

In the drawings, Figure 1 is perspective view of a planter constructed in accordance with my invention. Fig. 2 is a vertical central section of the same. Fig. 3 is a horizontal section on the plane indicated by the line 3 3 of Fig. 2. Fig. 4 is a similar transverse section on the plane indicated by the line 4 4 of Fig. 2. Fig. 5 is a detail view of the auxiliary seed-receptacle detached. Fig. 6 is a smaller view of the removable guide detached and inverted. Fig. 7 is a similar view of one of the series of slides detached. Fig. 8 is an inside elevation of a portion of the member 11 of the planter to show the positions of the conveyers with relation to the guides for the feed-slides and also to show the position of the hinge-pin by which the slides of the other member are connected with said first-named member.

Similar reference characters indicate corresponding parts in all the figures of the drawings.

The preferred embodiment of my invention consists of a duplex planter having relatively movable swinging sides or members 10 and 11, suitably provided at their upper ends with grips 12 and connected adjacent to their lower ends by cheek-plates 13, a vibratory throat-plate 14 being interposed between said members. In the construction illustrated the cheek-plates are rigidly secured at one edge to the member or wall 10, while the other member is pivotally mounted, as at 15, upon said cheek-plates, the throat-plate 14 also being pivoted, as at 16, to the cheek-plates and terminating adjacent to the lower edges of shoes $10^a$ and $11^a$, carried, respectively, by the members 10 and 11, the relative swinging movement of the members being such as to cause the lower edges of said shoes to come into contact with opposite sides of the lower edge of the throat-plate when the upper ends of the members are separated to the extent of their movement.

Each of the members of the apparatus embodying my invention carries a hopper, of which that (17) which is carried by the member 10 is preferably fixed, while that (18) which is carried by the member 11 is provided with flanges 19 to fit in guides 20, whereby said hopper 18 may be dismounted by sliding it upward to remove its flanges from said guides. Furthermore, each hopper is preferably provided with a suitable lid or cover, and the floor of the hopper 17, which is fixed to the member by which it is carried, consists of a guide 21, having a plurality of channels or slide-seats, of which I have shown three in the drawings. Any desired number of slide-seats may be employed in the guide; but I prefer to employ at least three, which are designated in the drawings as spaced slide-seats 22 and an intermediate seat 23. In these seats are fitted, respectively, the side slides 24 and 25, having feed-openings 26, and mounted upon each slide to control the extent or operative area of the opening is a gage 27, adapted for adjustment longitudinally of the slide. For convenience of adjustment these gages are connected for simultaneous movement by means of a transverse plate 28, and swiveled in one of the gages, preferably the intermediate one, is a feed-screw 29, extending through a feed-nut 30, carried by the intermediate slide, said feed-screw extending terminally beyond the outer end of the slide and being fitted with a grip 31, by which the operator may turn the feed-screw with facility to vary the positions of the gages with relation to the feed-openings, and thus control the amount of seed fed at each movement of the apparatus from the hopper into the seed-conductors 31ª, which extend from the plane of the slides to the lower ends of the oscillatory members 10 and 11 of the apparatus to deposit seed in hills. The slides are pivotally connected to the member 11, the same being provided, preferably at their inner ends, with eyes 32, through which extends a removable pivot-pin 33, extending through fixed eyes 34 of said member 11, whereby as the oscillatory members of the apparatus are moved toward and from each other the slides are reciprocated in the guide-seats provided for their reception to arrange the feed-openings thereof alternately in communication with the hopper and the seed-conveyers.

When it is desired to plant the corn or other seed at greater intervals than those between the intermediate and side slides—as, for instance, at intervals of six inches—it is necessary to cut off communication between the hopper and the feed-opening of the intermediate slide, and hence I have provided the bottom of the hopper with a cut-off slide 35, fitted in suitable guides 36 and having an operating-handle 37, which projects through the front wall of the hopper within reach of the operator. It is also desirable under certain circumstances to plant beans or pumpkin-seeds simultaneously with corn, and to enable this to be accomplished I employ an auxiliary receptacle 38, adapted to be arranged within the hopper 17 to form an intermediate compartment for communication with said feed-opening of the intermediate slide, said receptacle being provided at its upper end with an ear 39 for engagement with the upper edge of the front wall of the hopper, as shown in Figs. 1 and 2.

In addition to the main or corn hopper 17 I employ, when desirable, the above-mentioned auxiliary or fertilizer hopper 18, of which the floor is formed by means of a removable or detachable guide 40, provided at its under side with depending ears 41 for engagement with keepers 42 at the outer side of the oscillatory member 11. In this guide are formed side and intermediate slide-seats 43 and 44 for the reception of side and intermediate slides 45 and 46, having feed-openings 47, controlled by gages 48. As in the construction of the slides for the main or corn hopper, these gages 48 are connected by a transverse plate 49 to adapt them for simultaneous adjustment by means of a feed-screw 50, swiveled at its inner end in an intermediate gage and extending through a feed-nut 51 and beyond the outer end of the intermediate slide to terminate in a grip 52, which is within reach of the operator. When the fertilizer is not required, the hopper 18 may be displaced, as above set forth, the slides 45 and 46 may be dismounted from the guide and the latter correspondingly detached to lighten the structure. The inner ends of the slides are hingedly connected with the oscillatory member 10 by means of a removable pivot-pin 53, constructed and arranged substantially as described hereinbefore in connection with the seeding devices mounted upon the member 10. Furthermore, the hopper 18 is provided with a main cut-off slide 54, adapted to cut off communication between the hopper and the openings of the seed-slides and provided with a projecting handle 55, and mounted upon this main cut-off slide is an auxiliary cut-off slide 56, adapted to cut off communication between the interior of the hopper 18 and the feed-opening of the intermediate seed-slide 46, whereby when the cut-off slide of the main hopper 17 is closed, as when planting only two hills at a time, said auxiliary cut-off slide of the hopper 18 may be correspondingly closed to deposit the fertilizer only adjacent to the hills which are supplied with the seed by the main hopper.

In operation the oscillatory members of the apparatus are moved alternately toward and from each other, the former movement being designed to arrange the feed-openings of the seed-slides in registration with the hoppers and the latter movement being adapted to dispose said feed-openings, respectively, in communication with the conveyers, a series of auxiliary conveyers 57 being carried by the member 11 for coöperation with the slides 45 and 46. When the upper ends of the oscillatory members are separated to cause the feed-openings to deposit seed and fertilizer in the conveyers, the shoes at the lower ends of said members are arranged in contact with opposite sides of the throat-plate, and as said shoes are arranged to converge toward their lower ends they may in this position be driven into the soil to form a depression for the reception of the seed; but the seed is prevented from leaving the apparatus by reason of the above-mentioned contact of the shoes with the throat-plate. Therefore to deposit the seed it is necessary to move the upper ends of the members of the apparatus toward each other and thus open the shoes. To insure the deposit of both the seed and the fertilizer, it is necessary that the throat-plate during the opening of the shoes shall occupy an intermediate position, and hence extending inward from the oscillatory members 10 and 11 I provide operating-pins 58, adapted for terminal contact with opposite sides of the throat-plate as the members 10 and 11 are moved toward each other at their upper ends. The inward movement of the upper ends of the members 10 and 11, as above indicated, again causes communication of the feed-openings with the hoppers at the moment that the seed and fertilizer are deposited in the depression formed by the shoes, whereupon the apparatus may be lifted, the members 10 and 11 again separated at their upper ends to cause seed and fertilizer to be deposited in the conveyers and also to close the shoes, after which the shoes may be again driven into the soil, as above described, to form a second set of hills. The edges of the oscillatory members 10 and 11 above the plane of the connecting cheek-plates are connected by flexible webbing, forming accordion-walls 59, which exclude dust from the slides and other operating members of the apparatus.

It will be understood from the foregoing description that the apparatus embodying my invention is simple and may be readily manipulated to deposit corn or other seed at distances suitable for subsequent "thinning out" without disturbing the roots of those stalks which are desired to remain and that either the seed or the fertilizer distributing devices or both may be used as required, the operation of the fertilizer-distributing mechanism being under the control of the operator, whereby when not required it may be cut off by moving the main cut-off slide to its closed position. Furthermore, it will be understood that various changes in the form, proportion, and the minor details of construction may be resorted to without departing from the spirit or sacrificing any of the advantages of the invention.

Having described my invention, what I claim is—

1. In a hand-planter, the combination with connected oscillatory members, one of which carries a hopper and independent side and intermediate seed-conveyers, side and intermediate slides mounted in guides in the floor of the hopper and pivotally connected at their inner ends to the other oscillatory member, said slides being provided with seed-openings for alternate communication between the hopper and said conveyers, removable gages arranged in operative relation respectively with said seed-openings, and connected for simultaneous movement to vary the area of said openings, and means for adjusting the gages, consisting of a feed-screw swiveled in one of the gages, extending through a feed-nut, and projecting beyond the outer end of the slide by which it is carried, substantially as specified.

2. In a hand-planter, the combination of connected oscillatory members, a hopper carried by one of the members, independent side and intermediate seed-conveyers, side and intermediate seed-slides mounted in guides in the floor of said hopper and pivotally connected at their inner ends to the other member, and a cut-off slide for cutting off communication between the hopper and the feed-opening of the intermediate slide, and provided with an operating-handle projecting to a point without the hopper, substantially as specified.

3. In a hand-planter, the combination of connected oscillatory members, a hopper carried by one of the members, independent side and intermediate seed-conveyers, side and intermediate seed-slides mounted in guides in the floor of said hopper and pivotally connected at their inner ends to the other member, an auxiliary receptacle removably arranged in the hopper in registration with the intermediate seed-slide and provided at its upper end with an ear for engagement with the upper edge of the outer wall of the hopper, and a cut-off slide mounted in the hopper to cut off communication between said auxiliary receptacle and the feed-opening of said intermediate slide, substantially as specified.

4. In a hand-planter, the combination of connected oscillatory members, each carrying side and intermediate conveyers, hoppers mounted respectively upon said members, one of said hoppers being removably mounted, and having flanges fitted in guides on the member by which it is carried, and said hoppers also having floors consisting of guides provided with slide-seats, that guide which forms the floor of the removable hopper having depending ears for engagement with keepers on the oscillatory member by which it is carried, side and intermediate seed-slides mounted in said slide-seats, and having feed-openings for communication alternately with the hoppers and said conveyers, and removable pivot-pins for connecting the seed-slides of each hopper with the oscillatory member which carries the other hopper, substantially as specified.

5. In a hand-planter, the combination of connected oscillatory members, each carrying side and intermediate conveyers, hoppers mounted respectively upon said members, one of said hoppers being removably mounted, and having flanges fitted in guides on the member by which it is carried, and said hoppers also having floors consisting of guides provided with slide-seats, that guide which forms the floor of the removable hopper having depending ears for engagement with keepers on the oscillatory member by which it is carried, side and intermediate seed-slides mounted in said slide-seats, and having feed-openings for communication alternately with the hoppers and said conveyers, removable pivot-pins for connecting the seed-slides of each hopper with the oscillatory member which carries the other hopper, means for connecting the inner ends of the seed-slides of one member with the oscillatory member which carries the other hopper, and cut-off slides for controlling communication between the hoppers and the feed-openings of the intermediate seed-slides, substantially as specified.

6. In a hand-planter, the combination with connected oscillatory members carrying conveyers, hoppers carried respectively by the members and provided with slide-seats, seed-slides mounted in said seats and having their inner ends pivotally connected respectively with the members, a main cut-off slide in one of the hoppers for cutting off communication between the interior thereof and the feed-openings of the coöperating feed-slides, and an auxiliary cut-off slide arranged in each hopper, to cut off communication between the same and the feed-opening of one of the coöperating seed-slides, substantially as specified.

7. In a hand-planter, the combination of connected oscillatory members provided at their lower ends with convergent shoes, and having conveyers terminating adjacent to said shoes, hoppers carried by the members, coöperating seed-slides having feed-openings for communication alternately with the hoppers and the conveyers, and operatively connected with said members to receive reciprocatory movement therefrom, a vibratory throat-plate interposed between the members and terminating at the lower edges of said shoes, and operating-pins carried by the oscillatory members for centering the throat-plate when the shoes are separated, substantially as specified.

In testimony that I claim the foregoing as my own I have hereto affixed my signature in the presence of two witnesses.

JAMES M. WELCH.

Witnesses:
W. L. STARKEY,
J. A. A. VANDALE.